United States Patent
Kursun

(10) Patent No.: US 10,992,765 B2
(45) Date of Patent: Apr. 27, 2021

(54) MACHINE LEARNING BASED THIRD PARTY ENTITY MODELING FOR PREEMPTIVE USER INTERACTIONS FOR PREDICTIVE EXPOSURE ALERTING

(71) Applicant: BANK OF AMERICA CORPORATION, Charlotte, NC (US)

(72) Inventor: Eren Kursun, New York, NY (US)

(73) Assignee: Bank Of America Corporation, Charlotte, NC (US)

( * ) Notice: Subject to any disclaimer, the term of this patent is extended or adjusted under 35 U.S.C. 154(b) by 0 days.

(21) Appl. No.: 16/538,372

(22) Filed: Aug. 12, 2019

(65) Prior Publication Data

US 2021/0051206 A1     Feb. 18, 2021

(51) Int. Cl.
```
H04L 29/08     (2006.01)
G06N 20/00     (2019.01)
H04W 4/80      (2018.01)
H04W 4/029     (2018.01)
```

(52) U.S. Cl.
CPC ............. *H04L 67/22* (2013.01); *G06N 20/00* (2019.01); *H04W 4/029* (2018.02); *H04W 4/80* (2018.02)

(58) Field of Classification Search
CPC ............. H04L 63/1433; H04L 63/0263; H04L 63/107; H04L 67/22; H04L 67/02; H04L 67/306; H04W 4/021; H04W 4/029; H04W 4/80; H04W 12/00505; H04W 12/12; G06F 21/577; G06F 21/554; G06F 21/88; G06F 11/3438; G06F 21/50; G06N 20/00; G06N 3/08
See application file for complete search history.

(56) References Cited

U.S. PATENT DOCUMENTS

| | | |
|---|---|---|
| 5,819,226 A | 10/1998 | Gopinathan et al. |
| 7,392,942 B2 | 7/2008 | Dragt et al. |
| 7,580,891 B2 | 8/2009 | Klebanoff |
| 7,620,592 B2 | 11/2009 | OMara et al. |
| 7,743,981 B2 | 6/2010 | Williams |
| 7,953,658 B2 | 5/2011 | Huennekens et al. |
| 8,290,838 B1 | 10/2012 | Thakur et al. |
| 8,712,888 B2 | 4/2014 | Chisholm et al. |

(Continued)

*Primary Examiner* — Glenton B Burgess
*Assistant Examiner* — Rachel J Hackenberg
(74) *Attorney, Agent, or Firm* — Michael A. Springs; Moore & Van Allen PLLC; Nicholas C. Russell

(57) ABSTRACT

An electronic communication security system is typically configured for continuously tracking and monitoring user activity associated with a user, identifying a trigger based on continuously tracking and monitoring the user activity, wherein identifying the trigger is based on identifying that the user activity meets one or more conditions, determining initiation of an interaction between the user and a resource entity based on identifying the trigger, communicating with back-end systems to extract information associated with the resource entity associated with the interaction, wherein the information comprises an output that is generated by one or more machine learning models, generating exposure characteristics for the interaction based on the output associated with the resource entity and user data associated with the user, wherein the exposure characteristics are unique to the interaction and the user, and in response to generating the exposure characteristics, transmitting the exposure characteristics to a user device.

20 Claims, 9 Drawing Sheets

(56) References Cited

U.S. PATENT DOCUMENTS

| | | | |
|---|---|---|---|
| 8,843,108 B1 | 9/2014 | Lish et al. | |
| 9,230,066 B1 | 1/2016 | Bailey et al. | |
| 9,563,921 B2 | 2/2017 | Shi et al. | |
| 9,721,250 B2 | 8/2017 | Hammad et al. | |
| 9,818,121 B2 | 11/2017 | Snyder et al. | |
| 10,453,065 B2 | 10/2019 | Wagner | |
| 10,482,437 B2 | 11/2019 | Groarke | |
| 10,586,234 B2 | 3/2020 | Mueller | |
| 10,706,419 B2 | 7/2020 | Ferguson et al. | |
| 2013/0124628 A1* | 5/2013 | Weerasinghe | G06Q 30/0241 709/204 |
| 2013/0160129 A1* | 6/2013 | Sartin | G06F 21/552 726/25 |
| 2015/0154600 A1* | 6/2015 | Diehl | G06Q 20/4016 705/39 |
| 2016/0034898 A1 | 2/2016 | Ghosh | |
| 2016/0210606 A1 | 7/2016 | Henderson et al. | |
| 2017/0085587 A1* | 3/2017 | Turgeman | G06F 3/03547 |
| 2017/0091764 A1* | 3/2017 | Lloyd | G06Q 20/401 |
| 2017/0195307 A1* | 7/2017 | Jones-McFadden | H04W 12/06 |
| 2017/0243131 A1* | 8/2017 | Kephart | G06F 16/00 |
| 2017/0345006 A1 | 11/2017 | Kohli | |
| 2018/0081787 A1* | 3/2018 | Riddick | G06Q 20/00 |
| 2019/0392450 A1 | 12/2019 | Gosset et al. | |
| 2020/0403992 A1* | 12/2020 | Huffman | G06Q 20/326 |

\* cited by examiner

US 10,992,765 B2

MACHINE LEARNING BASED THIRD PARTY ENTITY MODELING FOR PREEMPTIVE USER INTERACTIONS FOR PREDICTIVE EXPOSURE ALERTING

BACKGROUND

During the interactions between users and third party entities, conventional systems are required to authenticate the interactions. However, the conventional systems are not required to provide any exposure related information associated with the interactions to the users which makes the authentication process ineffective as the chances of unauthorized interactions although is minimized by the authentication process, is not completely prevented by the conventional systems.

SUMMARY

Embodiments of the present invention address the above needs and/or achieve other advantages by providing apparatuses (e.g., a system, computer program product and/or other devices) and methods for preemptive user interactions for predictive exposure alerting. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may continuously track and monitor user activity associated with a user, identify a trigger based on continuously tracking and monitoring the user activity, wherein identifying the trigger is based on identifying that the user activity meets one or more conditions, determine initiation of an interaction between the user and a resource entity based on identifying the trigger, communicate with back-end systems to extract information associated with the resource entity associated with the interaction, wherein the information comprises an output that is generated by one or more machine learning models, generate exposure characteristics for the interaction based on the output associated with the resource entity and user data associated with the user, wherein the exposure characteristics are unique to the interaction and the user, and in response to generating the exposure characteristics, transmit the exposure characteristics to a user device.

In some embodiments, the system may generate one or more mitigation steps based on the exposure characteristics and the user data associated with the user and transmit the one or more mitigation steps to the user device of the user.

In some embodiments, tracking and monitoring the user activity comprises tracking and monitoring a geographical location of the user.

In some embodiments, identifying that the user activity meets the one or more conditions comprises identifying that the geographical location of the user matches a location of the resource entity.

In some embodiments, identifying that the user activity meets the one or more conditions comprises identifying a resource entity device via near field communication interface of the user device.

In some embodiments, tracking and monitoring the user activity comprises tracking and monitoring electronic activity of the user.

In some embodiments, identifying that the user activity meets the one or more conditions comprises identifying that a Uniform Resource Locator inputted by the user on the user device matches a resource entity Uniform Resource Locator based on tracking and monitoring the electronic activity of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
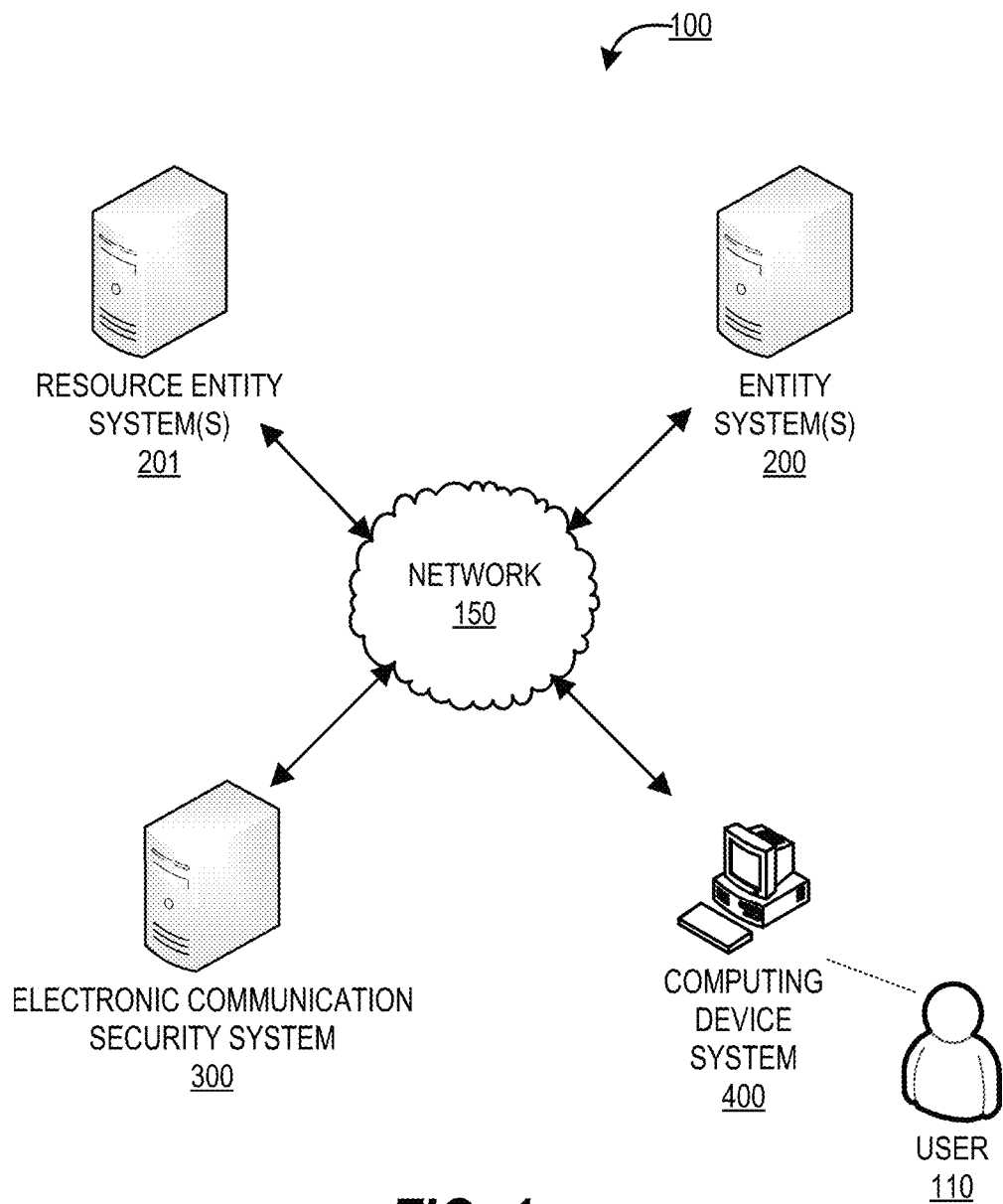
Figure 2:
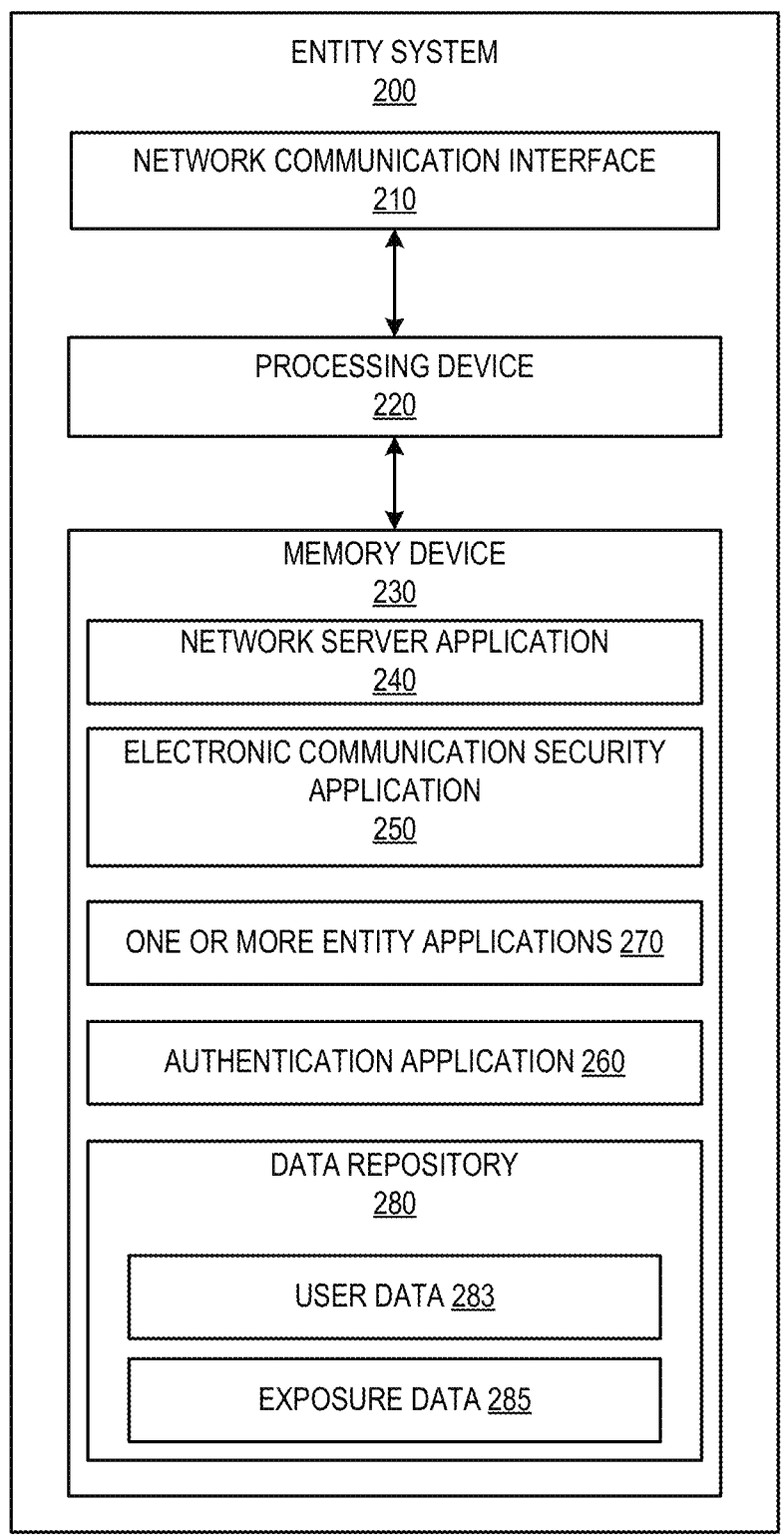
Figure 3:
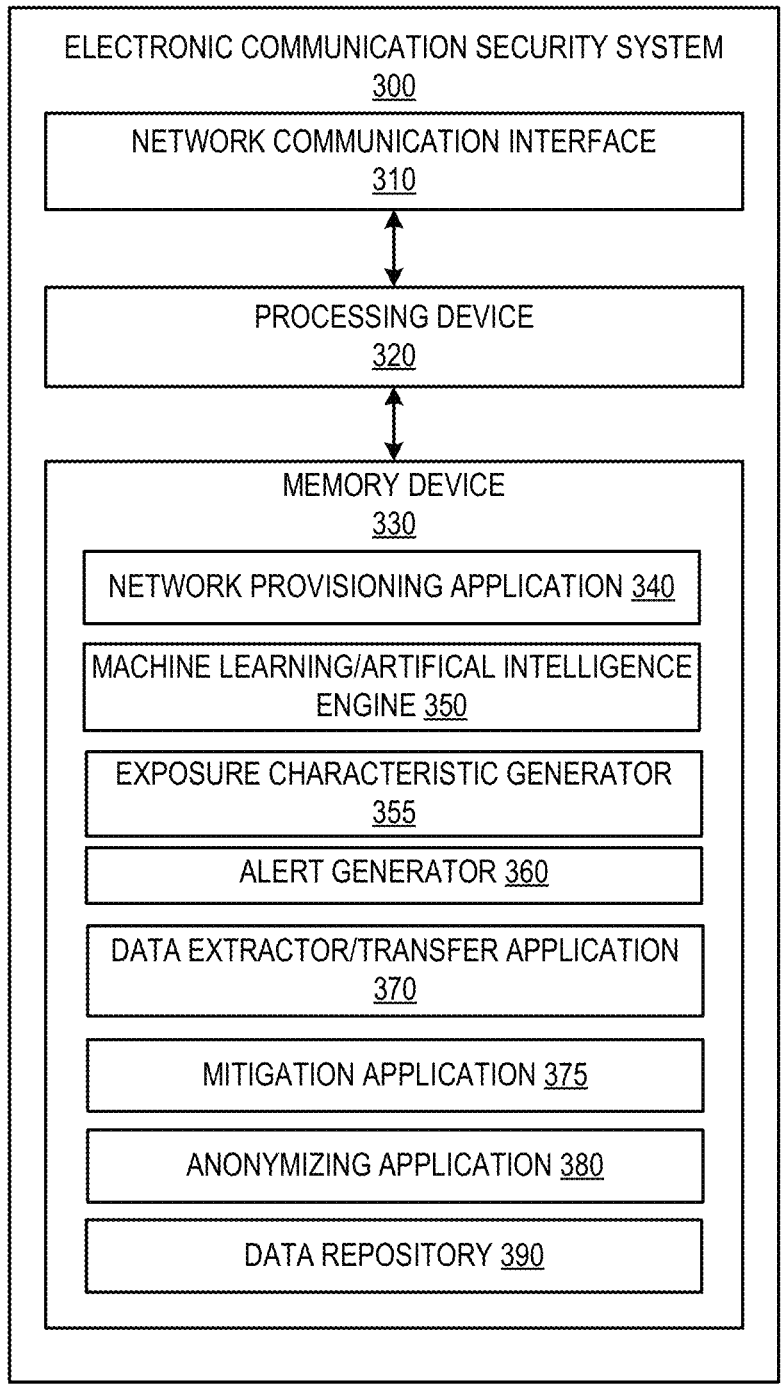
Figure 4:
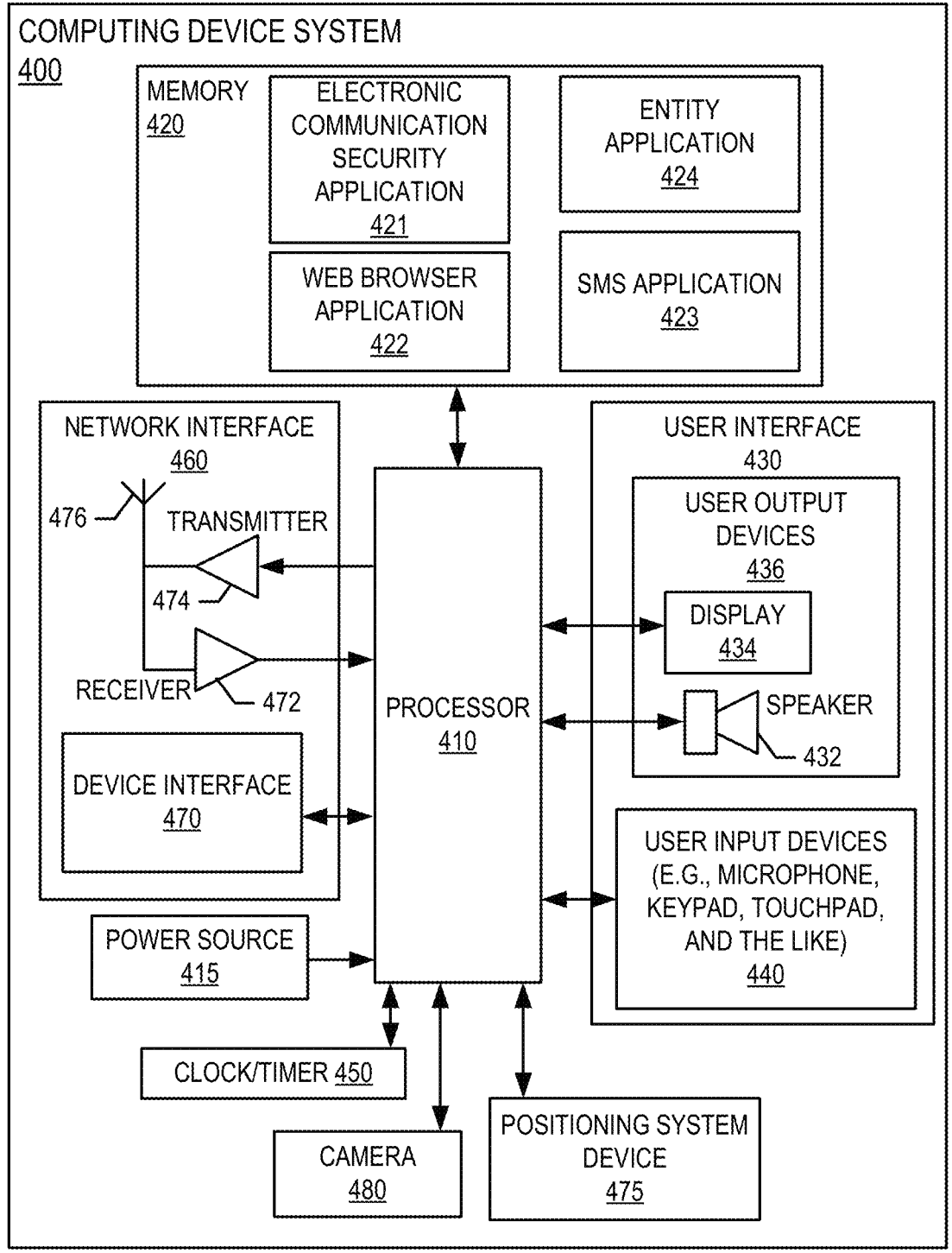
Figure 5:
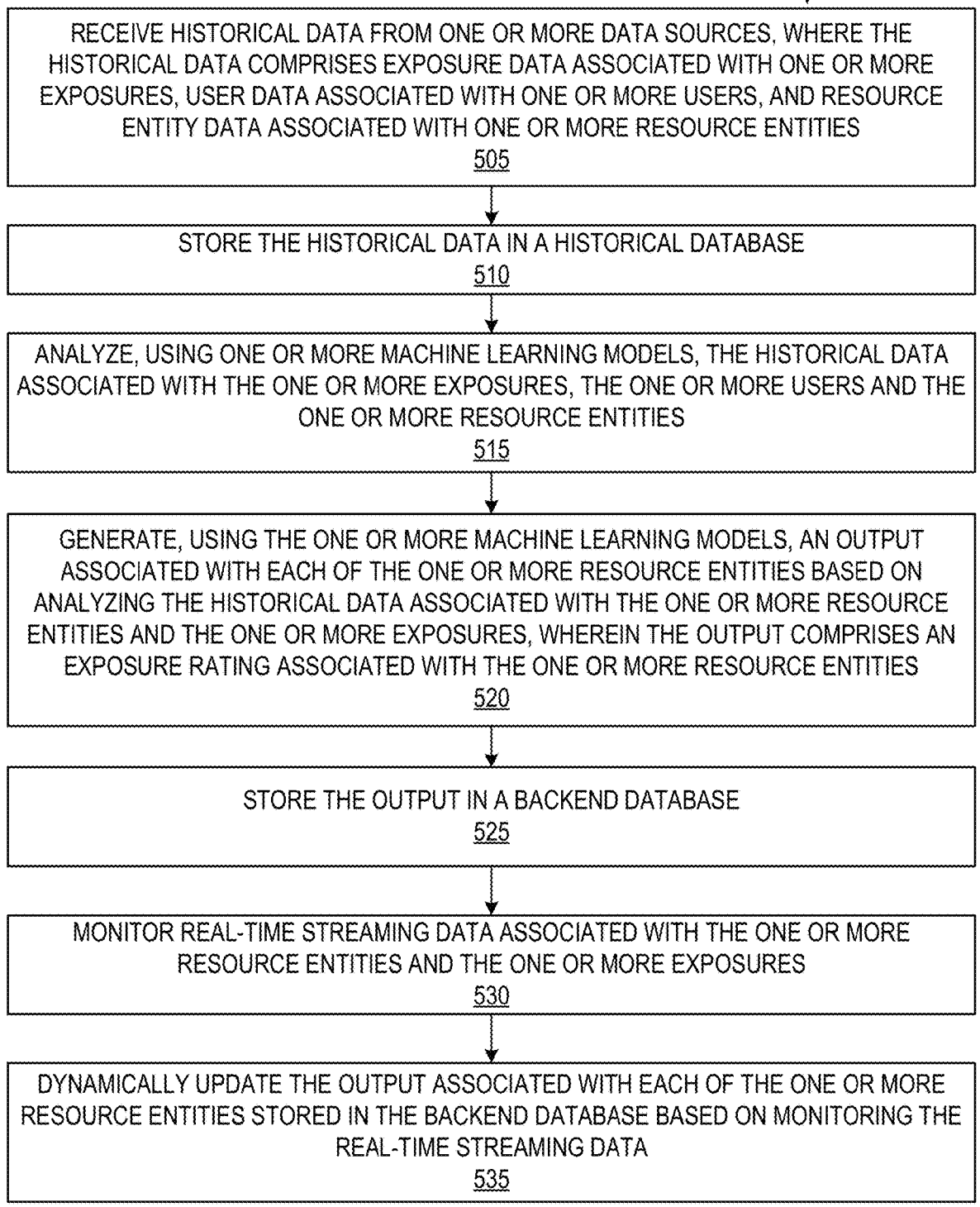
Figure 6:
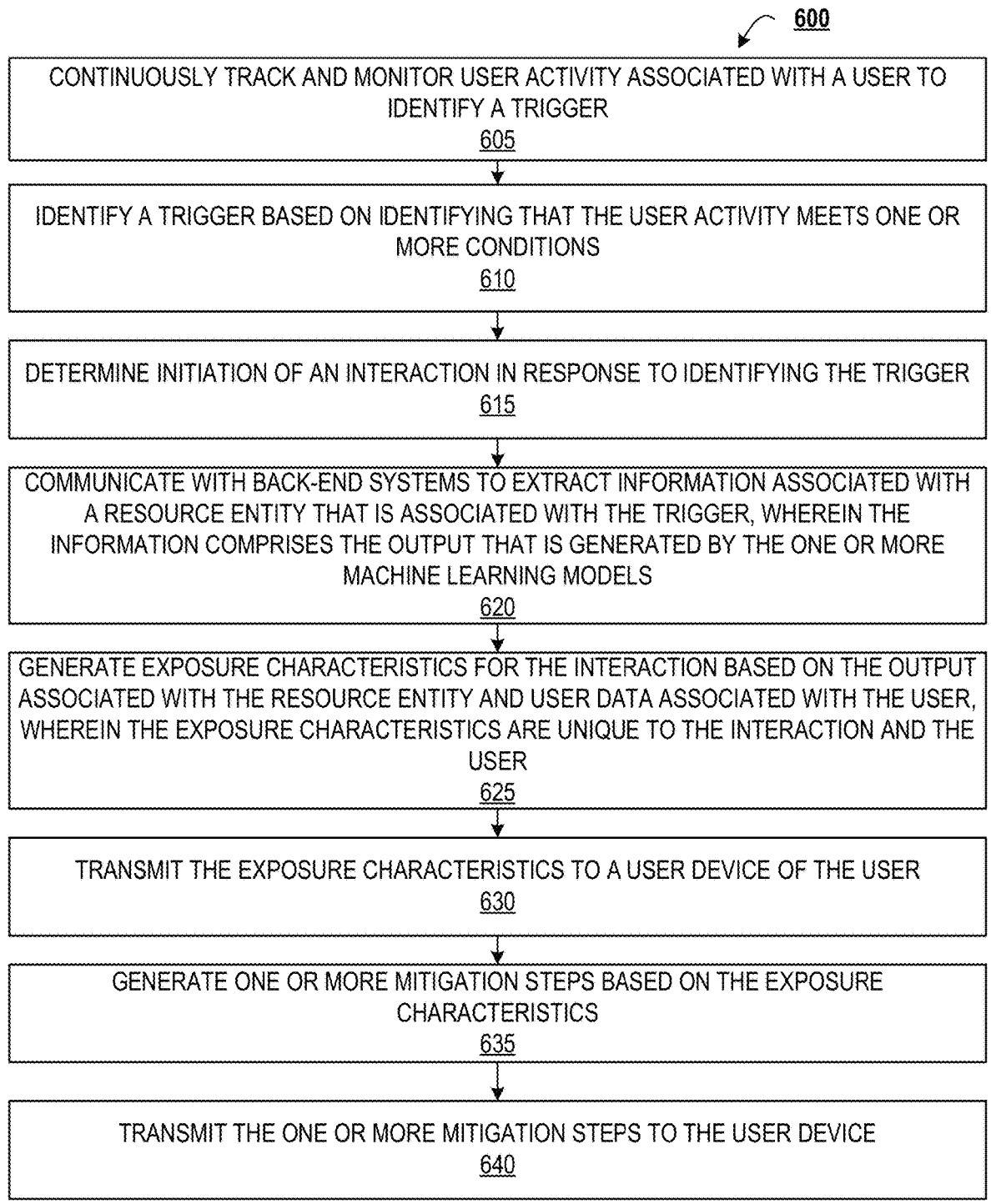
Figure 7:
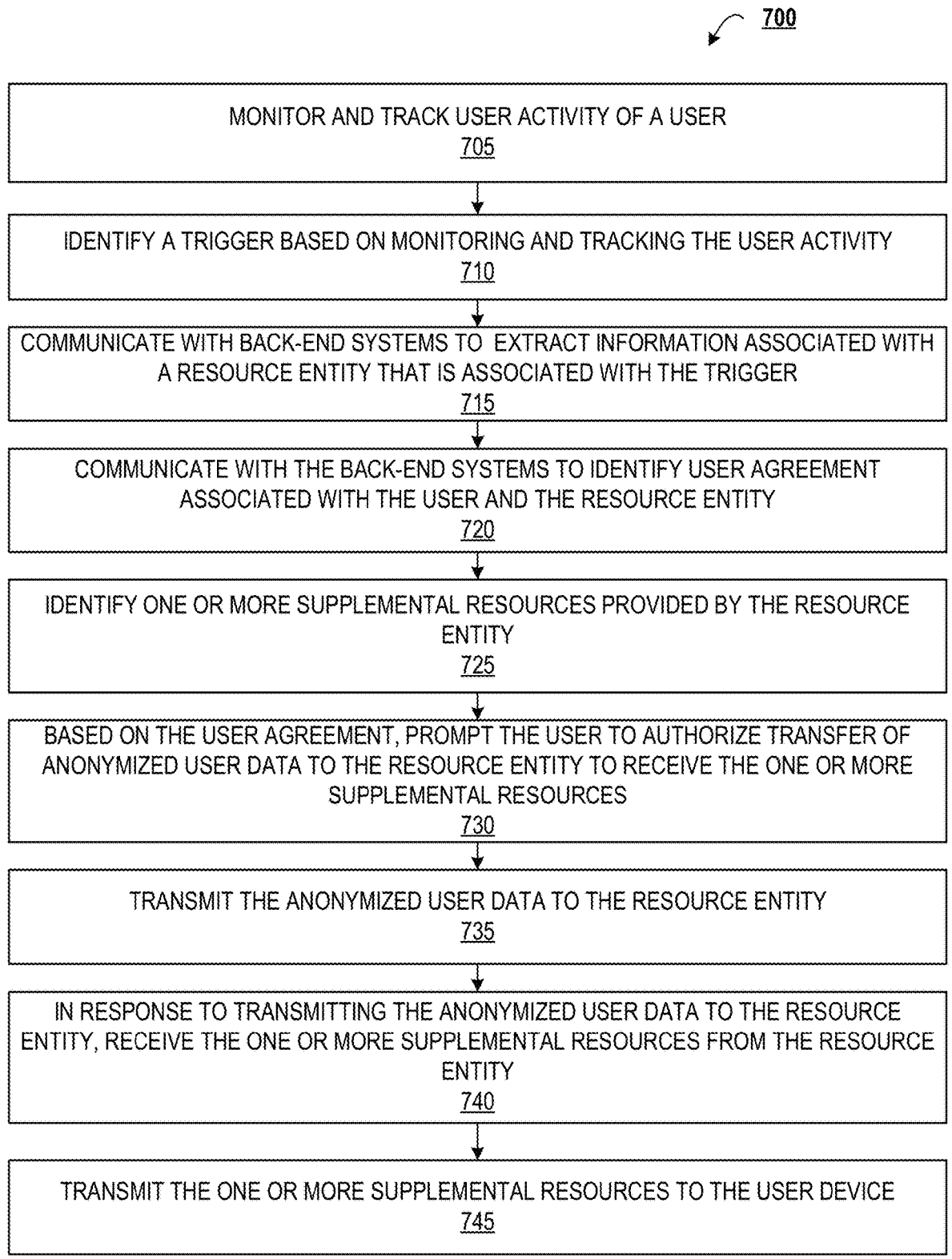
Figure 8:
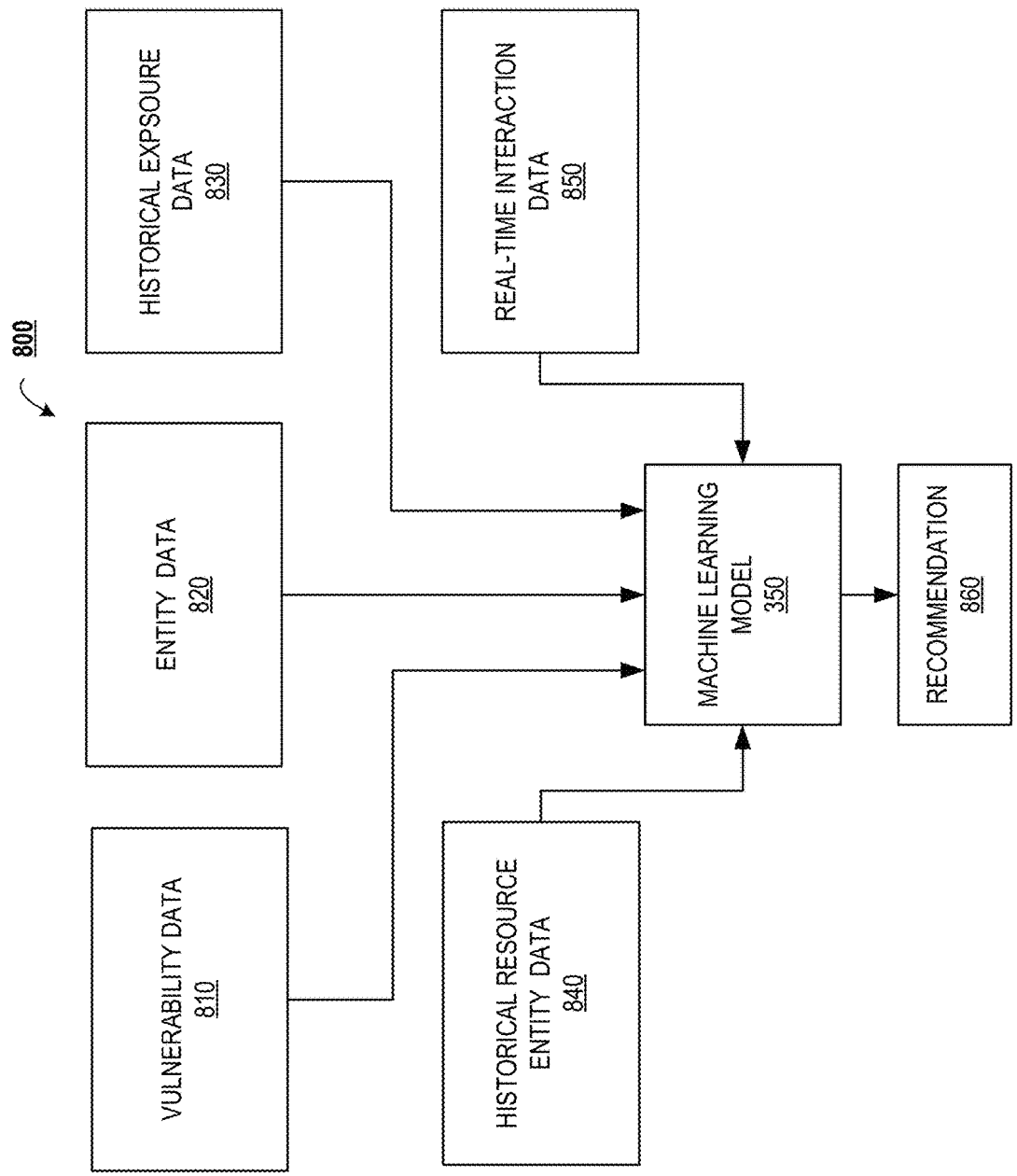
Figure 9:
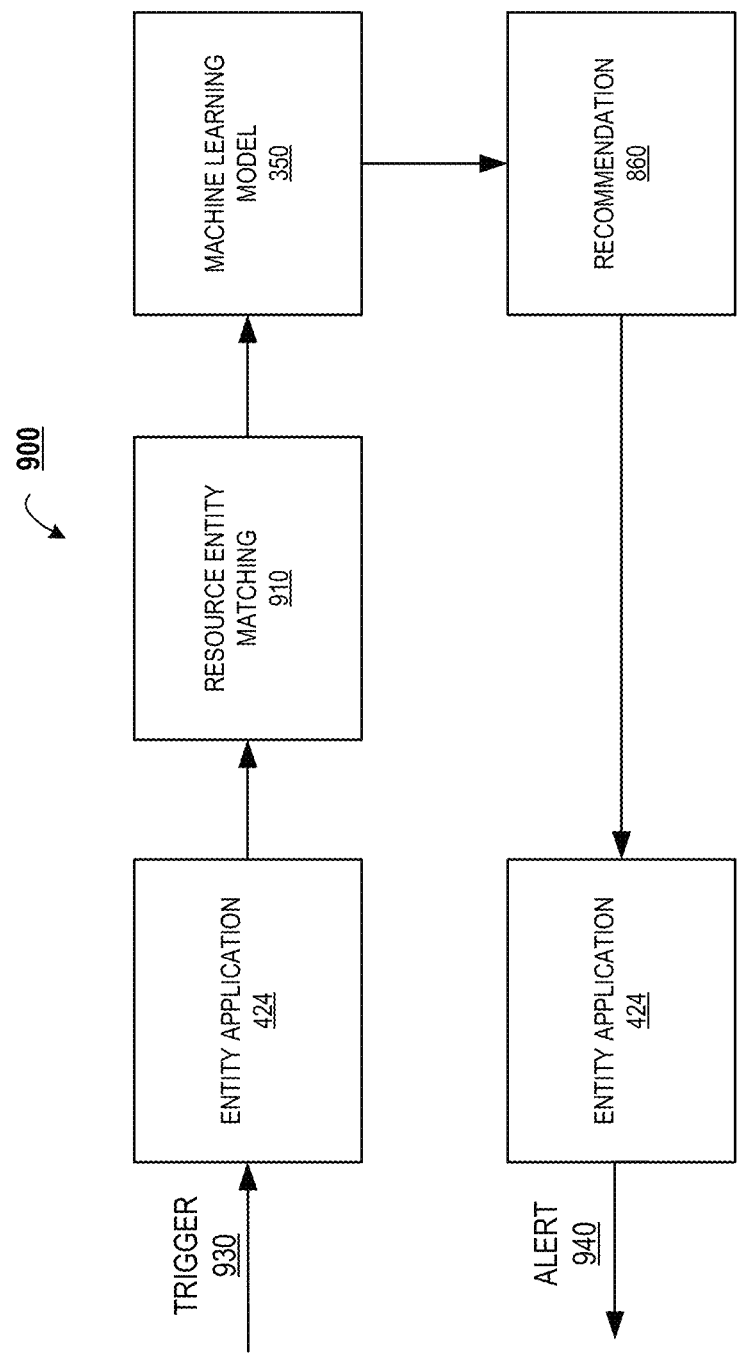

Having thus described embodiments of the invention in general terms, reference will now be made the accompanying drawings, wherein:

FIG. 1 provides a block diagram illustrating a system environment for preventing unauthorized interactions, in accordance with an embodiment of the invention;

FIG. 2 provides a block diagram illustrating the entity system 200 of FIG. 1, in accordance with an embodiment of the invention;

FIG. 3 provides a block diagram illustrating an electronic communication security system 300 of FIG. 1, in accordance with an embodiment of the invention;

FIG. 4 provides a block diagram illustrating the computing device system 400 of FIG. 1, in accordance with an embodiment of the invention;

FIG. 5 provides a flowchart illustrating a process flow for generating resource entities profiles datafiles for preventing unauthorized interactions, in accordance with an embodiment of the invention;

FIG. 6 provides a flowchart illustrating a process flow for generating and transmitting preemptive alerts associated with interactions, in accordance with an embodiment of the invention;

FIG. 7 provides a flowchart illustrating a process flow for providing anonymized communication between users and resource entities to prevent unauthorized interactions, in accordance with an embodiment of the present invention;

FIG. 8 provides a block diagram illustrating a process flow for generating a recommendation by a machine learning model of the electronic communication security system, in accordance with an embodiment of the present invention; and FIG. 9 provides a block diagram illustrating an exemplary embodiment for transmitting preemptive alerts associated with interactions, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In accordance with embodiments of the invention, the terms "entity" may include any organization that processes financial transactions including, but not limited to, banks, credit unions, savings and loan associations, investment companies, stock brokerages, asset management firms, insurance companies and the like. Furthermore, embodiments of the present invention use the term "user" or "customer." It will be appreciated by someone with ordinary skill in the art that the user or customer may be a customer of the financial institution or a potential customer of the financial institution. In accordance with embodiments of the present invention, the term "resource entity" or "third party entity" may be any merchant that provides resources such as goods, products, services, or the like. As used herein, the term "supplemental resources" may refer to any rewards, offers, discounts, or the like provided by the resource entities.

As used herein, an "electronic activity" refers to any activity that a user wishes to perform with an electronic system (e.g., any computer system or other electronic system operated by an entity). In some instances, an electronic activity may refer to the processing of a resource transfer or transaction. A "resource transfer" or "transaction" or "interaction", may refer to any activities or communication between a customer (e.g., either an individual person or an organization) of an entity and a resource entity, activities or communication between multiple entities/customers, and the like. A resource transfer may refer to a payment, processing of funds, processing of a check, purchase of goods or services, a return of goods or services, a payment transaction, a credit transaction, or other interactions involving a customer's account. In the context of a financial institution or a merchant, a resource transfer may refer to one or more of: a sale of goods and/or services, initiating an automated teller machine (ATM) or online banking session, an online transaction to purchase goods or services, or any other interaction involving the customer and/or the customer's device that invokes or is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" refers to any activity initiated between a customer and a resource entity such as a merchant, between the customer and the financial instruction, or any combination thereof.

In the instances where the entity is a financial institution, a customer may be an individual or organization with one or more relationships affiliations or accounts with the entity. An "account" may be the relationship that the customer has with the entity. Examples of accounts include a deposit account, such as a transactional account (e.g. a banking account), a savings account, an investment account, a money market account, a time deposit, a demand deposit, a pre-paid account, a credit account, a non-monetary customer datafile that includes only personal information associated with the customer, or the like. An account may be associated with and/or maintained by an entity.

FIG. 1 provides a block diagram illustrating a system environment 100 for preventing unauthorized interactions, in accordance with an embodiment of the invention. As illustrated in FIG. 1, the environment 100 includes an electronic communication security system 300, entity system 200, a computing device system 400, and one or more resource entity systems 201. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200.

The entity system(s) 200 may be any system owned or otherwise controlled by an entity to support or perform one or more process steps described herein. In some embodiments, the managing entity is a financial institution.

The electronic communication security system 300 is a system of the present invention for performing one or more process steps described herein. In some embodiments, the electronic communication security system 300 may be an independent system. In some embodiments, the electronic communication security system 300 may be a part of the entity system 200.

The electronic communication security system 300, the entity system 200, the computing device system 400, and/or the resource entity systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the electronic communication security system 300 is configured to communicate information or instructions with the entity system 200, the computing device system 400, and/or the resource entity systems 201 across the network 150.

The computing device system 400 may be a computing device of the user 11. In general, the computing device system 400 communicates with the user 110 via a user interface of the computing device system 400, and in turn is configured to communicate information or instructions with the electronic communication security system 300, entity system 200, and/or the resource entity systems 201 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, an electronic communication security application 250, one or more entity applications 270, an authentication application 260, and a data repository 280 comprises user data 283 and exposure data 285. The computer-executable program code of the network server application 240, the electronic communication security application 250, the one or more entity applications 270, and the authentication application 260 to perform certain logic, data-extraction, and data-storing functions of the entity system 200 described herein, as well as communication functions of the entity system 200.

The network server application 240, the electronic communication security application 250, the one or more entity applications 270, and the authentication application 260 are configured to store data in the data repository 280 or to use the data stored in the data repository 280 when communicating through the network communication interface 210 with the electronic communication security system 300, the computing device system 400, and/or the resource entity systems 201 to perform one or more process steps described herein. In some embodiments, the entity system 200 may receive instructions from the electronic communication security system 300 via the electronic communication security application 250 to perform certain operations. The electronic communication security application 250 may be provided by the electronic communication security system 300. The one or more entity applications 270 may be any of the applications used, created, modified, and/or managed by the entity system 200. The authentication application 260 may be used to authenticate one or more users 110 to access the one or more entity applications 270. In one embodiment, the entity application may be an online banking application provided by the entity system 200.

FIG. 3 provides a block diagram illustrating the electronic communication security system 300 in greater detail, in accordance with embodiments of the invention. As illustrated in FIG. 3, in one embodiment of the invention, the electronic communication security system 300 includes one or more processing devices 320 operatively coupled to a network communication interface 310 and a memory device 330. In certain embodiments, the electronic communication security system 300 is operated by a first entity, such as a financial institution, while in other embodiments, the electronic communication security system 300 is operated by an entity other than a financial institution. In some embodiments, the electronic communication security system 300 is owned or operated by the entity of the entity system 200. In some embodiments, the electronic communication security system 300 may be an independent system. In alternate embodiments, the electronic communication security system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the electronic communication security system 300 described herein. For example, in one embodiment of the electronic communication security system 300, the memory device 330 includes, but is not limited to, a network provisioning application 340, a machine learning/artificial intelligence engine 350, an exposure characteristics generator 355, an alert generator 360, a data extractor/transfer application 370, a mitigation application 375, an anonymizing application 380, and a data repository 390 comprising data processed or accessed by one or more applications in the memory device 330. The computer-executable program code of the network provisioning application 340, the machine learning/artificial intelligence engine 350, the exposure characteristics generator 355, the alert generator 360, the data extractor/transfer application 370, the mitigation application 375, and the anonymizing application 380 may instruct the processing device 320 to perform certain logic, data-processing, and data-storing functions of the electronic communication security system 300 described herein, as well as communication functions of the electronic communication security system 300.

The network provisioning application 340, the machine learning/artificial intelligence engine 350, the exposure characteristics generator 355, the alert generator 360, the data extractor/transfer application 370, the mitigation application 375, and the anonymizing application 380 are configured to invoke or use the data in the data repository 390 when communicating through the network communication interface 310 with the entity system 200, the computing device system 400, and/or the resource entity systems 201. In some embodiments, the network provisioning application 340, the machine learning/artificial intelligence engine 350, the exposure characteristics generator 355, the alert generator 360, the data extractor/transfer application 370, the mitigation application 375, and the anonymizing application 380 may store the data extracted or received from the entity system 200, the resource entity system 201, and the computing device system 400 in the data repository 390. In some embodiments, the network provisioning application 340, the machine learning/artificial intelligence engine 350, the exposure characteristics generator 355, the alert generator 360, the data extractor/transfer application 370, the mitigation application 375, and the anonymizing application 380 may be a part of a single application. One or more processes performed by the network provisioning application 340, the machine learning/artificial intelligence engine 350, the exposure characteristics generator 355, the alert generator 360, the data extractor/transfer application 370, the mitigation application 375, and the anonymizing application 380 are described in detail below.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, gaming devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an electronic communication security application 421, an entity application 424, or the like. These applications also typically instructions to a graphical user interface (GUI) on the display 430 that allows the user 110 to interact with the entity system 200, the electronic communication security system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the electronic communication security application 421 provided by the electronic communication security system 300 allows the user 110 to communicate with one or more resource entity systems 201 anonymously. In some embodiments, the entity application 424 provided by the entity system 200 and the electronic communication security application 421 allow the user 110 to perform one or more interactions. In some embodiments, the entity application 424 may be an online banking application. In some embodiments, the electronic communication security system 300 monitors user activity via the entity application 424, the web browser application 422, and other application stored in the memory 420.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 illustrates a process flow 500 for generating resource entities profiles datafiles for preventing unauthorized interactions, in accordance with an embodiment of the present invention. The process flow 500 illustrates steps performed by the system of the present invention to perform resource entity modeling or merchant modeling. Resource entity modeling may include categorizing the merchant datafiles comprising raw historical interaction data, exposure data, and the like.

As shown in block 505, the system receives historical data from one or more data sources, where the historical data comprises exposure data associated with one or more exposures, user data associated with one or more users, and resource entity data associated with one or more resource entities.

The system may receive exposure data from the entity system 200, where the exposure data comprises information associated with mass exposures (e.g., mass credit card compromises), misappropriation information associated with one or more devices (e.g., Automated Teller Machine skimmers) that are associated with the entity system 200, misappropriation information associated with one or more devices that are not associated with entity system 200 (e.g., misappropriated POS devices).

The system may receive user data associated with one or more users from the entity system 200, where the one or more users are customers of the entity. In some embodiments, the user data may include data associated with users that are not associated with the entity. The user data may comprise transaction data, personal information, or the like. The transaction data may include resource entity (e.g., merchant) information, product/service level information (e.g., products purchased, services received, or the like), resource entity location information, payment type (e.g., credit card payment, contactless payment, or the like), and the like.

The system may receive resource entity data from the resource entity system 201. The system may receive resource entity data from one or more resource entities. The resource entity data may comprise raw transaction information, product availability information, supplemental resources information (e.g., offers, discounts, etc.), merchant transaction velocity data (e.g., number of transactions within a time period), and the like.

As shown in block 510, the system stores the historical data in a historical database. In some embodiments, the system may create user datafiles comprising the user data for each of the one or more users and resource entity datafiles for each of the one or more resource entities. The system may associate the exposure data with each of the user datafiles and the resource entity and store the user datafiles and the resource entity datafiles in the historical database.

As shown in block 515, the system analyzes, using one or more machine learning models, the historical data associated with the one or more exposures, the one or more users and the one or more resource entities. The system analyzes the user datafiles and resource entity datafiles comprising the exposure data. As shown in block 520, the system generates, using the one or more machine learning models, an output associated with each of the one or more resource entities based on analyzing the historical data associated with the one or more resource entities and the one or more exposures, wherein the output comprises an exposure rating associated with the one or more resource entities. The exposure rating may be an exposure level associated with each of the one or more resource entities. For example, exposure rating of a resource entity may be low, medium, or high. In one exemplary embodiment, the system may identify a merchant datafile to identify that the merchant interaction velocity is very low and may assign a high exposure rating to the merchant datafile. The system, via machine learning models analyzes each bit of information received from the one or more data sources to generate the exposure ratings. In some embodiments, the system may classify the exposure rating for different type of interactions. For example, for a first resource entity, the system may analyze a first resource entity datafile and assign an exposure rating for contactless payment interactions as low and may assign an exposure rating for swipe interactions as high. As shown in block 525, the system stores the output in a backend database.

As shown in block 530, the system monitors real-time streaming data associated with the one or more resource entities and the one or more exposures. The real time streaming data may include real time exposure data, real time interaction data, real-time user data, and real-time resource entity data. For example, the system may tap into real-time streams and may monitor transactions to identify that all swipe transactions with a merchant are associated with misappropriation of credit card numbers and update the exposure rating of the merchant from low to high. As shown in block 535, the system dynamically updates the output associated with each of the one or more resource entities stored in the backend database based on monitoring the real-time streaming data.

FIG. 6 provides a flowchart illustrating a process flow 600 for generating and transmitting preemptive alerts associated with interactions, in accordance with an embodiment of the invention. As shown in block 605, the system continuously tracks and monitors user activity associated with a user to identify a trigger. The system may identify the user activity based on monitoring one or more devices associated with the user. In some embodiments, monitoring the user activity comprises monitoring the location of the user via the entity application 424 provided by the entity system 200 or the electronic communication security application 421 provided by the system of the present invention. In some embodiments, monitoring the user activity comprises monitoring the electronic activity of the user via the entity application 424 and electronic communication security application 421. The system may gain authorization from the user to access application data associated with the one or more user devices to monitor the electronic activity of the user.

As shown in block 610, the system identifies a trigger based on identifying that the user activity meets one or more conditions. The trigger may be an indication that the user may initiate an interaction with a resource entity. The one or more conditions may be predefined and stored in the data store of the system. The one or more conditions may include, but are not limited to, determining a match between a location of the user and location of a resource entity, determining a match between a Uniform Resource Locator (URL) inputted by the user into the user device and a Uniform Resource Locator (URL) associated with a resource entity, or any other indication that the user may engage in a potential interaction with a resource entity. In one exemplary embodiment, the system may identify that the user inputted a URL associated with a merchant into the web browser application 422 and may determine that the user may initiate a transaction with the merchant. In another exemplary embodiment, the system may identify the trigger based on determining a match between a location of the user and a resource entity location using the positioning system device 475 in the user device 400 of the user. In yet another exemplary embodiment, the system may identify the trigger based on identifying an RFID or ibeacon communication with the user device. The user may enter into a merchant store and may walk beside an RFID device used for performing transactions and may identify that the user may enter into a potential transaction at the merchant location.

As shown in block 615, the system determines initiation of an interaction in response to identifying the trigger. In one exemplary embodiment, the system may identify that the user proceeded to an order summary page on a website and may determine the initiation of the interaction. In another exemplary embodiment, the system may identify that the user has accessed the digital wallet and may determine the initiation of the interaction. In some embodiments, the system may identify that the user is searching for coupons or discounts associated with a merchant and may determine the initiation of the interaction.

As shown in block 620, the system communicates with back-end systems to extract information associated with a resource entity that is associated with the trigger, wherein the information comprises the output that is generated by the one or more machine learning models in block 520 or block 535 of FIG. 5. In an exemplary embodiment, where the interaction is an online interaction, the extracted information associated with the resource entity may comprise merchant website security issues, exposure rate associated with the merchant, high alert rate associated with the merchant, abnormal transaction volumes, reported transaction datafiles, or the like. In an exemplary embodiment, where the interaction is a brick and mortar interaction, the extracted information associated with the resource entity may comprise unauthorized interaction information associated with the merchant, compromised resource entity device information, or the like. In addition, the system may communicate with backend system to extract information associated with the user, where the information may include a user datafile associated with the user.

As shown in block 625, the system generates exposure characteristics for the interaction based on the output associated with the resource entity and user data associated with the user, wherein the exposure characteristics are unique to the interaction and the user. The exposure characteristics may include an exposure datafile that is unique to the interaction. For example, the system may identify that the exposure rating associated with a merchant is medium and may identify that the user has never entered into a transaction with the merchant before and may generate an exposure datafile comprising transaction exposure score indicating the exposure associated with entering into the transaction with this merchant, a recommendation associated with the transaction, number of previous transactions, merchant transaction velocity, and the like. In another example, the system may identify that the user performs transaction using a credit card based on the user data in the user datafile of the user and may identify that the merchant associated with the trigger has a high exposure rating associated with swipe type transactions. The system may generate an exposure datafile comprising a high transaction exposure score and may generate a recommendation not to perform a transaction using the credit card. As shown in block 630, the system transmits the exposure characteristics to a user device of the user.

As shown in block 635, the system generates one or more mitigation steps based on the exposure characteristics. The system may generate the one or more mitigation steps using the machine learning models. Continuing with the previous example, the system may identify that the user performs transaction using a credit card and may identify that the merchant associated with the trigger has a high exposure rating associated with swipe type transactions and low exposure rating associated with contactless type transaction. The system may suggest that the user perform a contactless transaction, thereby reducing the exposure associated with the transaction. As shown in block 640, the system transmits the one or more mitigation steps to the user device. The exposure characteristics and the one or more mitigation steps transmitted to the user device are preemptive alerts provided by the system to the user before entering into a transaction with a resource entity.

FIG. 7 provides a flowchart illustrating a process flow 700 for providing anonymized communication between users and resource entities to prevent unauthorized interactions, in accordance with an embodiment of the present invention. As shown in block 705, the system monitors and tracks user activity of a user. As shown in block 710, the system identifies a trigger based on monitoring and tracking the user activity. As shown in block 715, the system communicates with back-end systems to extract information associated with a resource entity that is associated with the trigger. The system may perform these steps discussed in block 705, 710, and 715 as explained above in FIG. 6.

As shown in block 720, the system communicates with the back-end systems to identify user agreement associated with the user and the resource entity. For example, the user may choose to receive supplemental resources from a first resource entity and not from a second resource entity. In some embodiments, the user may choose to share non-anonymized user data with a first resource entity and to not share the non-anonymized user data with a second resource entity. The preferences of the user may be stored in a data store in the backend systems. In some embodiments, the backend system may be the entity system 200.

As shown in block 725, the system identifies one or more supplemental resources provided by the resource entity. The one or more supplemental resources may be offers, discounts, cashback deals, or the like. In some embodiments, the supplemental offers may be provided by the resource entity only when the user registers with the resource entity. The process of registering may comprise user providing personal information and other product related information to the resource entity. However, sharing personal information may create vulnerabilities, where the personal information of the user may be misused by unauthorized users in case of data breaches. In order to reduce the vulnerabilities, the system of the present invention may act as a communication channel between users and resource entities. The system may anonymize the user data based on the user agreement and transfer the anonymized user data to receive the one or more supplemental offers. Anonymizing the user data may comprise obfuscating using any of the available obfuscation techniques. Anonymizing and communicating user data may comprise anonymizing personal information in the user datafile and communicating resources (e.g., products of interest) related to the user datafile to the resource entity. In some embodiments, a list comprising the products of interest may be automatically generated by the system based on the historical interaction data. In some embodiments, the system may generate the list based on prompting the user. In some embodiments, the system may use a combination of user input and historical interaction data to generate the list.

As shown in block 730, the system based on the user agreement, prompts the user to authorize transfer of anonymized user data to the resource entity to receive the one or more supplemental resources. The user may choose to be notified before transferring any user data to the resource entities in the user agreement. Based upon the user agreement, transmits a notification to the user and prompt the user to authorize the transmission of the data. As shown in block 735, the system transmits the anonymized user data to the resource entity.

As shown in block 740, the system in response to transmitting the anonymized user data to the resource entity, receives the one or more supplemental resources from the resource entity. The system may receive one or more supplemental resources that are specific to the user (e.g., products of interest) based on the user data transmitted to the resource entity by the system. As shown in block 745, the system transmits the one or more supplemental resources to the user device.

In addition, the system may provide a real-time communication platform, where the real-time communication platform allows anonymized communication between the one or more user and the one or more resource entities. The real-time communication platform allows the user and the resource entities to negotiate deals, price of the products, or the like. During negotiation, if the user provides any personal information via the real-time communication platform, the system automatically identifies such information and anonymizes the personal information before displaying the information to the resource entity.

In some embodiments, the system may communicate with the resource entities to get supplemental resources for a user even without the initiation of the trigger. For example, the system may identify that the user purchases a particular product every year and may provide supplemental resources related to the product from multiple resource entities. The user may choose the best supplemental resource and may proceed with the purchase of the product with the resource entity that provides the best supplemental resource. The process of providing supplemental offers may also be based on the exposure characteristics generated by the system related to each entity. For example, if a merchant is providing best discount on a product, the system without automatically providing the best offer to the user, performs exposure analysis, generates exposure rating and exposure datafile related to the merchant, and transmits the discount offered by the merchant to the user only if the exposure related to the merchant and the transaction is low in the generated exposure datafile.

FIG. 8 provides a block diagram 800 illustrating a process flow for generating a recommendation by a machine learning model of the electronic communication security system, in accordance with an embodiment of the present invention. As shown, the system receives and feeds vulnerability data 810, entity data 820, historical exposure data 830, and historical resource entity data 840 into the machine learning model 350 and causes the machine learning model 350 to generate a recommendation 860 associated with real-time interactions based on the real-time interaction data 850 provided by the system. The real-time interaction data 850 is gathered based on continuously tracking and monitoring user activity. In some embodiments, the vulnerability data 810 may comprise cybersecurity data, mass exposure history data, and other vulnerability related data. In some embodiments, the entity data may comprise historical data associated with entity devices (e.g., POS devices). In some embodiments, the historical exposure data 830 may comprise historical exposure data associated with each of the one or more resource entities, claims and alert data associated with various time periods, or the like. The historical resource entity data 840 may comprise resource entity interaction history, resource entity interaction volumes and velocities, resource entity and entity segment data, resource entity interaction data (e.g., date, time, amount, and the like).

FIG. 9 provides a block diagram 900 illustrating an exemplary embodiment for transmitting preemptive alerts associated with interactions, in accordance with an embodiment of the present invention. The system identifies a trigger 930 via the entity application 424. For example, the system identifies via an online banking application that a user is about to enter into an interaction with a merchant. The system identifies the merchant by finding a match in the existing resource entity data. For example, the system may identify the merchant based on identifying a match between the location of a user and location associated with a merchant that is present in the memory of the system. In another example, the system may identify the merchant based on identifying a match between an identification associated with a POS device and the merchant data in the memory of the system. The system, via the machine learning model 350 generates a recommendation 860 associated with the interaction and pushes the recommendation 860 to the user device of the user. The system may display the recommendation 860 as an alert 940 via the entity application 424. The interaction described herein may be an online interaction or a brick and mortar interaction.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 16/538,274 | MACHINE LEARNING BASED THIRD PARTY ENTITY MODELING FOR PREDICTIVE EXPOSURE PREVENTION | Concurrently herewith |
| 16/538,380 | MACHINE LEARNING BASED USER AND THIRD PARTY ENTITY COMMUNICATIONS | Concurrently herewith |

The invention claimed is:
1. An electronic communication system, comprising:
one or more computer processors;
a memory; and a processing module stored in the memory, executable by the one or more computer processors and configured to:
continuously track and monitor user activity associated with a user;
identify a trigger based on continuously tracking and monitoring the user activity, wherein identifying the trigger is based on identifying that the user activity meets one or more conditions;
determine initiation of an interaction between the user and a resource entity based on identifying the trigger;
communicate with back-end systems to extract information associated with the resource entity associated with the interaction, wherein the information comprises an output that is generated by one or more machine learning models, wherein the output comprises security information, exposure rate, alert rate, abnormal interaction volumes, and reported interaction information;
generate exposure characteristics for the interaction based on the output associated with the resource entity and user data associated with the user, wherein the exposure characteristics are unique to the interaction and the user, wherein the exposure characteristics comprise interaction specific exposure datafile comprising an interaction exposure score, interaction specific recommendation, resource entity interaction velocity, and historical interaction information; and
in response to generating the exposure characteristics, transmit the exposure characteristics to a user device.

2. The electronic communication system of claim 1, wherein the processing module stored in the memory, executable by the one or more computer processors and configured to:
generate one or more mitigation steps based on the exposure characteristics and the user data associated with the user; and
transmit the one or more mitigation steps to the user device of the user.

3. The electronic communication system of claim 1, wherein tracking and monitoring the user activity comprises tracking and monitoring a geographical location of the user.

4. The electronic communication system of claim 3, wherein identifying that the user activity meets the one or more conditions comprises identifying that the geographical location of the user matches a location of the resource entity.

5. The electronic communication system of claim 1, wherein identifying that the user activity meets the one or more conditions comprises identifying a resource entity device via near field communication interface of the user device.

6. The electronic communication system of claim 1, wherein tracking and monitoring the user activity comprises tracking and monitoring electronic activity of the user.

7. The electronic communication system of claim 6, wherein identifying that the user activity meets the one or more conditions comprises identifying that a Uniform Resource Locator inputted by the user on the user device matches a resource entity Uniform Resource Locator based on tracking and monitoring the electronic activity of the user.

8. A computer program product for detection and prevention of unauthorized interactions, comprising a non-transitory computer-readable storage medium having computer-executable instructions for:
continuously tracking and monitoring user activity associated with a user;
identifying a trigger based on continuously tracking and monitoring the user activity, wherein identifying the trigger is based on identifying that the user activity meets one or more conditions;
determining initiation of an interaction between the user and a resource entity based on identifying the trigger;
communicating with back-end systems to extract information associated with the resource entity associated with the interaction, wherein the information comprises an output that is generated by one or more machine learning models, wherein the output comprises security information, exposure rate, alert rate, abnormal interaction volumes, and reported interaction information;
generating exposure characteristics for the interaction based on the output associated with the resource entity and user data associated with the user, wherein the exposure characteristics are unique to the interaction and the user, wherein the exposure characteristics comprise interaction specific exposure datafile comprising an interaction exposure score, interaction specific recommendation, resource entity interaction velocity, and historical interaction information; and
in response to generating the exposure characteristics, transmitting the exposure characteristics to a user device.

9. The computer program product according to claim 8, wherein the non-transitory computer-readable storage medium comprises computer-executable instructions for:
generating one or more mitigation steps based on the exposure characteristics and the user data associated with the user; and
transmitting the one or more mitigation steps to the user device of the user.

10. The computer program product according to claim 8, wherein the non-transitory computer-readable storage medium comprises computer-executable instructions for tracking and monitoring the user activity further comprise tracking and monitoring a geographical location of the user.

11. The computer program product according to claim 10, wherein identifying that the user activity meets the one or more conditions comprises identifying that the geographical location of the user matches a location of the resource entity.

12. The computer program product according to claim 8, wherein identifying that the user activity meets the one or more conditions comprises identifying a resource entity device via near field communication interface of the user device.

13. The computer program product according to claim 8, wherein tracking and monitoring the user activity comprises tracking and monitoring electronic activity of the user.

14. A computerized method for detection and prevention of unauthorized interactions, wherein the method comprises:
continuously tracking and monitoring user activity associated with a user;
identifying a trigger based on continuously tracking and monitoring the user activity, wherein identifying the trigger is based on identifying that the user activity meets one or more conditions;
determining initiation of an interaction between the user and a resource entity based on identifying the trigger;
communicating with back-end systems to extract information associated with the resource entity associated with the interaction, wherein the information comprises an output that is generated by one or more machine learning models, wherein the output comprises security information, exposure rate, alert rate, abnormal interaction volumes, and reported interaction information;

generating exposure characteristics for the interaction based on the output associated with the resource entity and user data associated with the user, wherein the exposure characteristics are unique to the interaction and the user, wherein the exposure characteristics comprise interaction specific exposure datafile comprising an interaction exposure score, interaction specific recommendation, resource entity interaction velocity, and historical interaction information; and in response to generating the exposure characteristics, transmitting the exposure characteristics to a user device.

15. The computerized method of claim 14, wherein the method further comprises:

generating one or more mitigation steps based on the exposure characteristics and the user data associated with the user; and transmitting the one or more mitigation steps to the user device of the user.

16. The computerized method of claim 14, wherein tracking and monitoring the user activity comprises tracking and monitoring a geographical location of the user.

17. The computerized method of claim 16, wherein identifying that the user activity meets the one or more conditions comprises identifying that the geographical location of the user matches a location of the resource entity.

18. The computerized method of claim 14, wherein identifying that the user activity meets the one or more conditions comprises identifying a resource entity device via near field communication interface of the user device.

19. The computerized method of claim 14, wherein tracking and monitoring the user activity comprises tracking and monitoring electronic activity of the user.

20. The computerized method of claim 19, wherein identifying that the user activity meets the one or more conditions comprises identifying that a Uniform Resource Locator inputted by the user on the user device matches a resource entity Uniform Resource Locator based on tracking and monitoring the electronic activity of the user.

* * * * *